United States Patent

Mourot

[11] Patent Number: 5,479,446
[45] Date of Patent: Dec. 26, 1995

[54] CHANNEL ESTIMATION DEVICE

[75] Inventor: Christophe Mourot, Asnieres, France

[73] Assignee: Alcatel N.V., Amsterdam, Netherlands

[21] Appl. No.: 128,234

[22] Filed: Sep. 29, 1993

[30] Foreign Application Priority Data

Oct. 7, 1992 [FR] France .................................... 92 11886

[51] Int. Cl.⁶ ................................................ H04B 14/04
[52] U.S. Cl. ............................................ 375/243; 375/346
[58] Field of Search .................................. 375/11–14, 94, 375/96, 99–103

[56] References Cited

U.S. PATENT DOCUMENTS

| | | | |
|---|---|---|---|
| 5,091,918 | 2/1992 | Wales | 375/229 |
| 5,199,047 | 3/1993 | Koch | 375/96 |
| 5,228,057 | 7/1993 | Larsson | 375/366 |
| 5,260,972 | 11/1993 | Wange | 375/96 |

FOREIGN PATENT DOCUMENTS

| | | |
|---|---|---|
| 0496152A2 | 7/1992 | European Pat. Off. . |
| 0496467A2 | 7/1992 | European Pat. Off. . |
| WO9211708 | 7/1992 | WIPO . |

OTHER PUBLICATIONS

Kaveh Phlavan et al, "Performance of Adaptive Matched . . . Channels", *IEEE Transactions on Communications 38*, 1990 (Dec., No. 12, pp. 2106–2113).

French Search Report 9211886 dated Jun. 29, 1993.

*Primary Examiner*—Stephen Chin
*Assistant Examiner*—Don N. Vo
*Attorney, Agent, or Firm*—Sughrue, Mion, Zinn, Macpeak & Seas

[57] ABSTRACT

A channel estimation device receives at one end of the channel a training sequence corresponding to a learning sequence produced at the other end of the channel. The estimation device generates a replica of the learning sequence and establishes the correlation of the learning and training sequences in order to produce a set of correlation coefficients. The estimation device includes a corrector device for eliminating the coefficients having the lowest moduli. The criteria used for eliminating the lowest moduli coefficients is that the sum of the squares of the moduli of the eliminated coefficients is less than a fraction of the sum of the squares of the moduli of all the correlation coefficients.

3 Claims, 1 Drawing Sheet

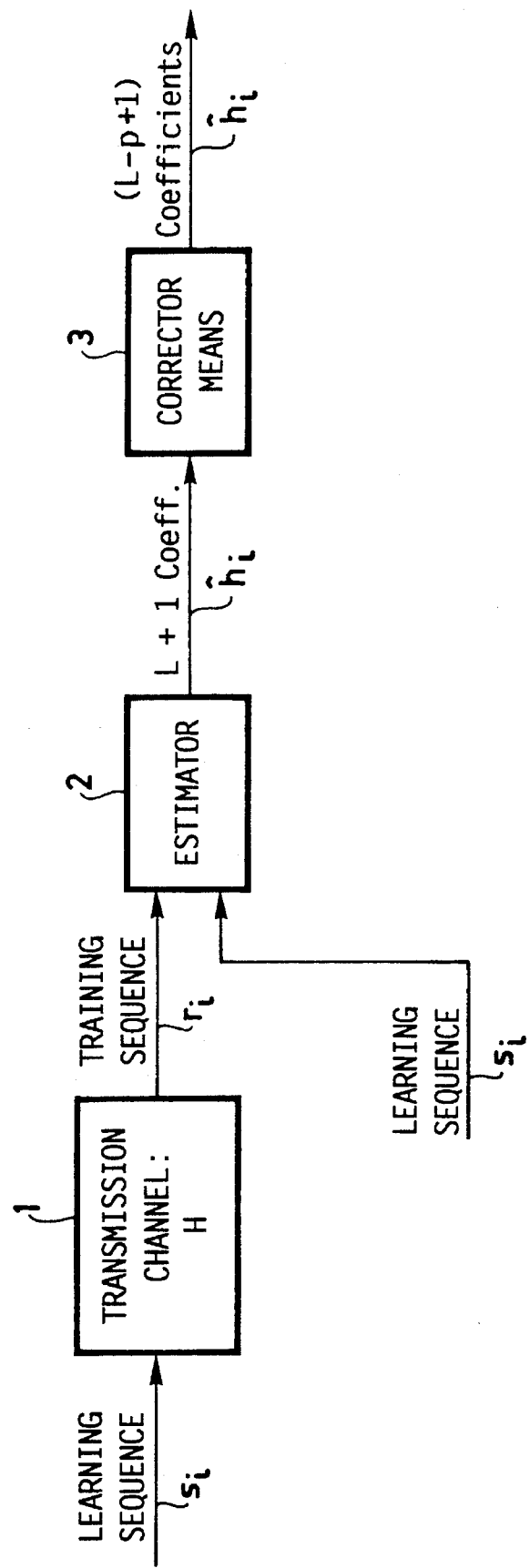

CHANNEL ESTIMATION DEVICE

BACKGROUND OF THE INVENTION

1. Field of the Invention

The present invention concerns a channel estimation device.

2. Description of the Prior Art

In a transmission system such as a radio transmission system a transmitter sends a sequence of symbols to a receiver on a transmission channel. The sequence is subject to deterioration in the transmission channel with the result that the sequence of symbols received by the receiver is no longer identical to the sequence transmitted. The main deterioration is intersymbol interference caused by the fact that a symbol can take more than one path in the transmission channel. If at least two paths have a time difference exceeding the distance between two symbols transmitted in succession a symbol on one of these paths will interfere with a following symbol on another, shorter path.

An equalizer is used to correct intersymbol interference in the receiver. To operate correctly it must know the impulse response of the transmission channel. To this end special symbols are transmitted in a learning sequence. These are known symbols, unlike the data symbols transmitted which can be assumed to be unknown to the receiver. It is therefore standard practise for a packet of symbols sent to a specific receiver to comprise data symbols, a learning sequence and further data symbols, i.e. the learning sequence in the middle of the packet.

The learning sequence is chosen to suit the characteristics of the transmission channel and in particular its length.

Given that the symbols are transmitted regularly at a period called the symbol duration the length of the channel is defined as the number of symbol durations which is equal to the difference between the longest and shortest paths.

A channel estimator is used in the receiver to establish the impulse response of the transmission channel. It generates a replica of the learning sequence and correlates it with the received sequence of symbols. The result of this correlation is a set of coefficients $h_i$ with i varying from 0 through L where L is the length of the channel. This set of coefficients is supplied to the equalizer. The most direct path in the channel is represented by $h_0$ and the other coefficients represent longer paths which cause interference with the first.

In the most usual case the coefficients are complex because the received symbols comprise "in-phase" and "quadrature" components which are orthogonal. Hereinafter the set of coefficients is called the impulse response.

To allow for the most diverse transmission conditions the length L of the channel would theoretically be infinite but in practise it is a constant chosen to suit the transmission system and supplied to the channel estimator. If this length is assigned a low value the longest paths of the channel are deliberately eliminated and the performance of the equalizer is degraded if these paths are actually used because the equalizer does not have all of the data representing the transmission channel. It would therefore seem desirable to use a high value for the channel length. However, this considerably increases the complexity of the equalizer, whether operating on the principle of symbol by symbol detection (for example the "Decision Feedback Equalizer" or DFE) or on the principle of maximum likelihood, by estimating a sequence of symbols (for example the "Viterbi" equalizer). The complexity of the equalizer, equivalent in the present context to the number of operations to be effected, is directly related to the number of correlation coefficients.

The patent application WO 92/11 708 proposes to eliminate all the coefficients whose modulus is less than a given fraction of the largest modulus of these coefficients.

This solution is directed to the specific instance of a channel having a profile in which the only meaningful paths correspond to coefficients which have substantially the same modulus, all the other coefficients representing paths which do not contribute any additional information. This solution is not generally applicable.

An object of the present invention is therefore a channel estimation device which, using a large channel length, enables the equalizer that it feeds to be simplified, regardless of the channel profile.

SUMMARY OF THE INVENTION

The present invention consists in a channel estimation device receiving at one end of said channel a training sequence corresponding to a learning sequence produced at the other end of said channel, generating a replica of said learning sequence and establishing the correlation of said learning and training sequences in order to produce a set of correlation coefficients. It comprises corrector means for eliminating coefficients having the lowest moduli so that the sum of the squares of the moduli of the coefficients is less than a fraction of the sum of the squares of the moduli of all the correlation coefficients.

In one embodiment of the channel estimation device corrector means are adapted to cancel a particular number of correlation coefficients in order of increasing modulus.

The invention will emerge more clearly from the following description of embodiments of the invention given by way of example with reference to the accompanying drawing which shows the estimator applied to a transmission channel.

BRIEF DESCRIPTION OF THE DRAWING

The drawing figure is a block diagram of the estimator device of the present invention.

DETAILED DESCRIPTION OF THE INVENTION

The invention applies to most transmission systems provided that they satisfy certain constraints explained hereinafter.

Referring to the figure, the transmission channel 1 which has an impulse response H receives the transmitted symbols $s_i$ forming a learning sequence and delivers the received symbols $r_i$ forming a training sequence.

The transmission channel estimator 2 also receives the learning sequence $s_i$ generated locally and the training sequence $r_i$ to produce an estimate of the impulse response $\hat{H}$ of the transmission channel 1. If L denotes the length of the channel and P the length of the learning sequence the estimator 2 must produce an estimate $\hat{H}$ of the impulse response represented by the coefficients $\hat{h}_i$ with i varying from 0 through L from the h transmitted symbols $s_i$ with i varying from 1 through P and the received symbols $r_i$ with i varying from L+1 through P using the least squares criterion. The object is thus to minimize the root mean square error J:

$$J = \sum_{i=L+1}^{P} |e_i|^2 \text{ or } e_i = r_i - \sum_{k=0}^{L} h_k \cdot s_{i-k}$$

Adopting the following notation:

$$H = \begin{pmatrix} h_0 \\ h_1 \\ \cdot \\ \cdot \\ \cdot \\ h_L \end{pmatrix}, R = \begin{pmatrix} r_{L+1} \\ r_{L+2} \\ \cdot \\ \cdot \\ \cdot \\ r_P \end{pmatrix}, E = \begin{pmatrix} e_{L+1} \\ e_{L+2} \\ \cdot \\ \cdot \\ \cdot \\ e_P \end{pmatrix}$$

and given that the hermitian transposition operator is represented by $.^H$ and that the conjugation operator is represented by $.^*$:

$$H^H = \begin{pmatrix} * & * & & * \\ h_0 & h_1 & \ldots & h_L \end{pmatrix}$$

$$R^H = \begin{pmatrix} * & * & & * \\ r_{L+1} & r_{L+2} & \ldots & r_P \end{pmatrix}$$

$$E^H = \begin{pmatrix} * & * & & * \\ e_{L+1} & e_{L+2} & \ldots & e_P \end{pmatrix}$$

Introducing the transmission matrix A and its hermitian transposition $A^H$:

$$A^H = \begin{pmatrix} * & * & & * \\ s_{L+1} & s_{L+2} & \ldots & s_P \\ * & * & & * \\ s_L & s_{L+1} & \ldots & s_{P-1} \\ \cdot & \cdot & \ldots & \cdot \\ \cdot & \cdot & \ldots & \cdot \\ \cdot & \cdot & \ldots & \cdot \\ * & * & & * \\ s_1 & s_2 & \ldots & s_{P-L} \end{pmatrix}$$

We may write:

$$E = R - A^H$$

$$J = E^H E$$

The solution is given by the set of coefficients $\hat{h}_i$ which cancels the drift in the root mean square error J relative to the estimated impulse response $\hat{H}$:

$$\frac{\partial J}{\partial H} = -2A^H R + 2A^H A H$$

$$A^H A \hat{H} = A^H R$$

It can be seen that for the coefficients $\hat{h}_i$ to be accessible it must be possible to invert the matrix $A^H A$. In this case these coefficients are obtained from the following equation:

$$\hat{H} = (A^H A)^{-1} A^H R$$

The condition whereby it must be possible to invert the matrix $A^H A$ for the invention to be implemented is satisfied if the learning sequence is a Constant Amplitude Zero Amslitude Correlation (CAZAC) sequence. Sequences of this type are described in the article by A. MILEWSKI: "Periodic sequences with optimal properties for channel estimation and fast start-up equalization", IBM Journal of Research and Development, vol. 27, n° 5, Sept. 83, pages 426–431.

This condition is also satisfied if the learning sequence is a pseudo-CAZAC sequence in the sense that it behaves like a CAZAC sequence near the correlation peak. The pseudo-CAZAC sequences include the sequences used in the European GSM digital cellular mobile radio system.

When the coefficients $\hat{h}_i$ have been calculated the invention consists in providing corrector means 3 for cancelling the lowest of them, i.e. those with the smallest contribution to the impulse response of the transmission channel. One possible basis for comparison for this contribution is the sum of the squares of the moduli of all the coefficients $\hat{h}_i$ for example.

In one embodiment of the invention the squares of the moduli of the coefficients $\hat{h}_i$ are listed in increasing order. The sum T of the squares of the moduli of all the coefficients $\hat{h}_i$ is also calculated. A threshold S is defined by means of a specific coefficient C such that S=CT. The first p items from the list such that their sum is less than. S and the sum of these p items and the (p+1)th item of the list is greater than S are then determined. Once the number p has been determined, the p coefficients $\hat{h}_i$ corresponding to the first p items of the list are forced to zero, i.e. eliminated.

The list of the squares of the moduli need not be complete, it being sufficient that it comprises p items. A procedure is therefore feasible in which this list is established progressively, item by item, while determining the number p and is interrupted as soon as the number p has been found.

The threshold S or the coefficient C is determined empirically, for example by simulation using a model of the transmission channel. The man skilled in the art will readily understand that it is a matter of achieving a compromise, i.e. that the threshold must be neither too high nor too low but adjusted to optimise the operation of the equalizer.

The performance of the estimator of the invention is inversely proportional to the signal to noise ratio at the receiver. To give a numerical example, the value of C may be 0.05 for a signal to noise ratio of up to 20 dB while a value of 0.02 may be required for a signal to noise ratio exceeding 20 dB.

The criterion adopted for eliminating some of the coefficients $\hat{h}_i$ is entirely satisfactory. Other criteria are feasible within the scope of the invention, however, for example:

eliminating all the coefficients $\hat{h}_i$ for which the square of the modulus is less than a particular fraction of the sum T of the squares of the moduli of all the coefficients, or eliminating unconditionally a particular number of coefficients $\hat{h}_i$ having the lowest moduli, this number possibly being 1.

There is claimed:

1. A channel estimation device comprising:

an estimator for receiving at one end of a transmission channel a training sequence which corresponds to a learning sequence transmitted at another end of said channel, for receiving also a locally-generated replica of the transmitted learning sequence, and for calculating a correlation between the training sequence and the replica learning sequence in order to produce a set of correlation coefficients, each of said correlation coefficients having a modulus; and corrector means for receiving the set of correlation coefficients, said corrector means calculating a sum T of squares of moduli of all of the correction coefficients in the set, and eliminating a subset of correlation coefficients whose sum of squares of moduli is less than a predetermined fraction of the sum T, said subset being formed from correlation coefficients whose moduli are smallest.

2. A channel estimation device comprising:

an estimator for receiving at one end of a transmission channel a training sequence which corresponds to a learning sequence transmitted at another end of said channel, for receiving also a locally-generated replica of the transmitted learning sequence, and for calculating a correlation between the training sequence and the replica learning sequence in order to produce a set of correlation coefficients, each of said correlation coefficients having a modulus; and corrector means for receiving the set of correlation coefficients, said corrector means eliminating a subset of N correlation coefficients, N being a predetermined number, said subset being formed from correlation coefficients whose moduli are smallest.

3. A channel estimation device comprising:

an estimator for receiving at one end of a transmission channel a training sequence which corresponds to a learning sequence transmitted at another end of said channel, for receiving also a locally-generated replica of the transmitted learning sequence, and for calculating a correlation between the training sequence and the replica learning sequence in order to produce a set of correlation coefficients, each of said correlation coefficients having a modulus; and corrector means for receiving the set of correlation coefficients, said corrector means calculating a sum T of squares of moduli of all of the correction coefficients in the set, and eliminating each correlation coefficient having a square of the modulus which is less than a predetermined fraction of the sum T.

\* \* \* \* \*